Patented July 27, 1954

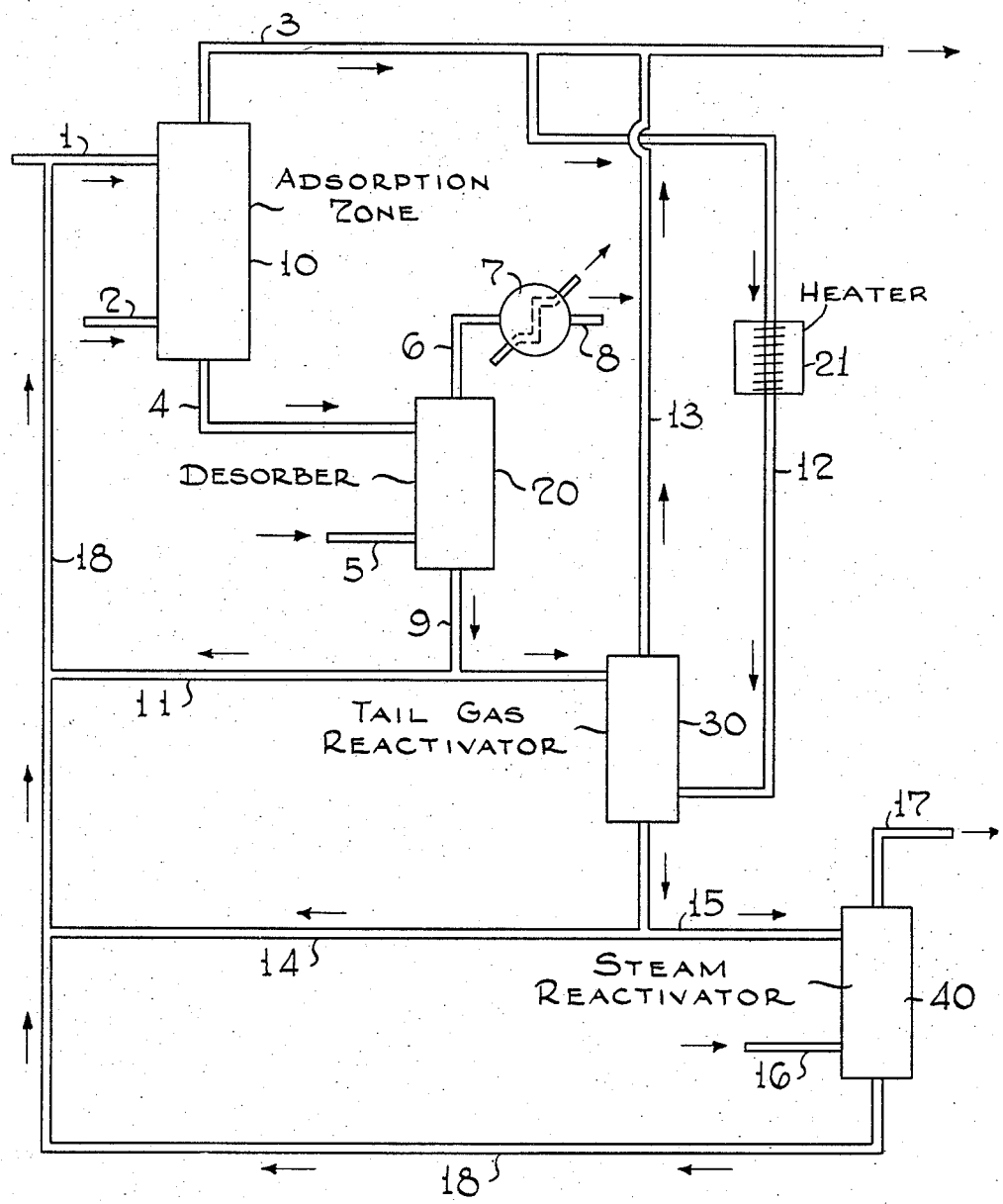

2,684,731

UNITED STATES PATENT OFFICE 2,684,731

ACTIVATED CARBON ADSORPTION AND REGENERATION

Charles E. Starr, Jr., and Edwin J. Newchurch, Baton Rouge, La., assignors to Standard Oil Development Company, a corporation of Delaware Application September 21, 1949, Serial No. 116,976

6 Claims. (Cl. 183—114.2)

The present invention is concerned with an improved process for the regeneration of carbons which have a high selectivity for the separation of one type of molecular constituents from other types and also one molecular weight from other molecular weights of the same type. By regenerating the carbon in accordance with the present invention, reactivated carbon of improved activity and selectivity is readily secured. In accordance with the present invention, a selective carbon which has become spent in the segregation of one type of molecular weight hydrocarbon constituent from others is regenerated by contacting the spent carbon with tail gas secured in the adsorption cycle. The tail gas is defined as that portion of the total feed gas that is not adsorbed in the adsorption cycle.

It is well known in the art to prepare activated carbons by various procedures. These carbons are secured from various sources such as peat, sawdust, bituminous coal, petroleum coke, nut shells, and the like. However, the activity of the respective carbons varies appreciably depending upon the sources from which they are derived and upon the activation procedure. A very desirable carbon is one which is secured, for instance, from cocoanut charcoal. This is produced by carbonizing the cocoanut shells at about 700° F. to 1200° F., preferably in vacuum or in the presence of steam, followed by steam activation of the char at about 1200° F. to 1600° F. Activated carbons may also be produced from peat or sawdust or from mixtures of the two by reaction with potassium sulfide at about 1600° F. to 1700° F. followed by steam activation at about 900° F. to 1500° F.

The activated carbons are utilized in adsorption processes for the segregation of one type of molecular weight hydrocarbon constituent from others. After a time period, the efficiency, as judged by activity and selectivity, of the activated carbon is reduced and it is thus necessary to reactivate the same. This is usually accomplished by heating the carbon to a temperature in the range from about 1100° F. to 1500° F. and treating the same with steam. Under these conditions, an appreciable amount of the carbon is burned off resulting in regeneration of the remainder. However, the loss of carbon in many operations is relatively high. In accordance with the present process, the spent carbon is reactivated to a high degree of efficiency by contacting the same with tail gas from the adsorption operation at a temperature generally not exceeding about 1100° F.

The present invention may be readily understood by reference to the drawing illustrating one embodiment of the same. Referring specifically to the drawing, activated carbon prepared in accordance with the procedure described is introduced into adsorption zone 10 by means of feed line 1. The carbon flows downwardly in zone 10 and contacts upflowing gases which are introduced into zone 10 by means of line 2. For the purpose of illustration, it is assumed that the gases comprise n-paraffins and iso-paraffins. The n-paraffins are adsorbed preferentially on the carbon. The treated gases, free of adsorbed constituents, are removed overhead from zone 10 by means of line 3, while the carbon containing the desired adsorbed constituents is removed from the bottom of zone 10 by means of line 4. The carbon is introduced in desorption zone 20, wherein it is contacted with an upflowing desorption agent which is introduced into the lower area of zone 20 by means of line 5. The desorption agent introduced by means of line 5 may comprise steam which is removed overhead by means of line 6 along with the recovered adsorbed constituents. These constituents are recondensed in cooling zone 7, withdrawn by means of line 8, and further handled or refined, as desired.

If the carbon remains sufficiently active, it is withdrawn from zone 20 by means of line 9 and preferably recycled to the top of zone 10 by means of line 11. However, periodically or continually, at least a portion of the carbon removed from the bottom of zone 20 is passed to a regeneration zone 30 by means of line 9 wherein the same is contacted in accordance with the present invention with upflowing tail gases removed overhead from adsorption zone 10 by means of line 3. These tail gases are introduced in the bottom of zone 30 by means of line 12, having been heated to the desired reactivator temperature in heater 21. The tail gases are removed overhead from zone 30 by means of line 13 and are preferably recombined with the overhead gases in line 3 and removed from the system. In accordance with one concept of the present invention, the reactivated carbon is removed from the bottom of zone 30 by means of line 14 and preferably recycled to the top of zone 10.

With respect to a more specific and preferred adaptation of the present invention, wherein it is desired to employ a two-stage reactivation process, the activated carbon removed from zone 30 by means of line 14 is introduced into zone 40 by means of line 15. In this zone, the carbon is further contacted with steam at a higher temperature. The steam is introduced into zone 40 by means of line 16 and removed overhead by means of line 17. The completely reactivated carbon is removed from the bottom of zone 40 by means of line 18 and preferably recycled to the top of adsorption zone 10.

In accordance with specific adaptations of the present invention, it is preferred to recycle directly to the adsorption zone from 25 to 75% of the total carbon removed from the desorption zone and to pass the remaining 25 to 75% of carbon to a tail gas reactivation zone. It is then preferred to recycle to the adsorption zone from 25 to 75% of the activated carbon removed from the tail gas reactivation zone and to pass the remaining 25 to 75% of this carbon to a steam activation zone.

The activated carbon of the present invention is prepared by coking the carbonaceous material, for example, cocoanut shells or bituminous coal, at about 700° F. to 1200° F. in a vacuum or in the presence of steam or an inert gas. The resulting char is activated by steaming at about 1200° F. to 1600° F., preferably in a fluid type reactor.

The activated carbon product, is adapted for the segregation of various types of hydrocarbon constituents such as the separation of n-paraffins from iso-paraffins. The n-paraffins are adsorbed preferentially on the carbon. The carbon is removed and the n-paraffins recovered by desorption, preferably by treatment with steam. The n-paraffins may also be recovered by treating the carbon with other hydrocarbons boiling in a different boiling range. The n-paraffins thus recovered are relatively pure. It is also within the scope of the present invention to employ the highly selective carbon to separate mixtures of gases, for example, ethylene and propane, coke-oven gas containing hydrogen sulfide, and the like. In general the feed stream is in the vapor phase and comprises hydrocarbon constituents having less than about 5 carbon atoms in the molecule, as for example, butanes, propanes and the like. Although it is preferred to employ steam as the desorbing agent other suitable desorbing agents may be used as for example nitrogen and the like.

The activated carbon product may be used as pointed out in the treatment of hydrocarbons either in the liquid or gaseous phase. If the vapor phase operation be conducted, it is preferred that the temperatures not exceed about 350° F. Pressures may be as high as 50 to 100 pounds per square inch. Desorption of the adsorbed product is preferably carried out by subjecting the carbon containing the adsorbed products to a temperature in the range from about 500° F. to 700° F. If a liquid phase operation be utilized, the temperatures may be as high as 150° F. The pressures likewise may vary appreciably.

It is within the scope of the present invention to employ the activated carbon in the fluidized state. Under these conditions, the diameter size of the carbon particles is in the range from about 20 to 120 microns and higher. The velocity of the upflowing gases is in the range from about .5 to 15 feet per second.

The temperatures and pressures employed in the adsorption zone may vary appreciably depending upon the type of gas being treated and depending upon the type of constituents which it is desired to adsorb. In general, the temperatures employed in adsorption zone 10 are below 250° F. In accordance with the present invention, the temperatures maintained in the tail gas activation zone are preferably not in excess of about 1100° F. It is preferred that the temperatures in this zone be in the range from about 900° F. to 1100° F. If further activation is carried out, it is desirable that the temperature in the steam activation zone be in the range from about 1300° F. to 1800° F.

It is desirable that tail gas consist of such materials as are not readily adsorbed on the charcoal. It is inherent in the process that any gas which passes the adsorption stage unadsorbed below a temperature of 250° F. will be a good reactivating agent at 1100° F.

Broadly the invention may be utilized in the separation of one type of molecular constituent from others or in the separation of one molecular weight constituent from another. A specific adaptation of the invention is in the segregation of ethylene from overhead gases secured in conventional oil absorption operations. In these operations petroleum gases secured from various refining operations comprising normally gaseous constituents and also containing butanes and pentanes are contacted with an absorption oil under conditions to segregate the relatively higher boiling hydrocarbon constituents in the absorption oil. The overhead gases comprise, among other constituents, carbon dioxide, hydrogen, nitrogen, methane, ethane, ethylene, propane and propylenes. These gases are introduced into an adsorption zone wherein the methane and other fixed gases are removed overhead. The downflowing active carbon selectively adsorbs propane, propylene and other higher boiling constituents. A relatively pure ethylene stream is removed as a side stream between the point of feed introduction and the top of the column from which the fixed gases are removed. This relatively pure ethylene stream may be used for any desired purpose, as for example as feed to an ethylene alkylation operation.

The present invention may be more readily understood by the following example illustrating the same:

*Example*

An activated charcoal having 93% activity was prepared as described. This active carbon was used in adsorption operations to secure normal paraffins from isoparaffins. The feed gases comprise normally gaseous hydrocarbons. After the activity of the charcoal had decreased to 62% the charcoal was reactivated utilizing steam and tail gas with the following results:

| Oper. No. | Temp. | Reactivation Gas | Time of Treat, Hr. | Resulting Activity, Percent |
|---|---|---|---|---|
| 1 | 1,000 | Steam | 1 | 78 |
| 2 | 1,000 | Tail gas [1] | 1 | 79 |
| 3 | 1,380 | Steam [2] | 1 | 84 |
| 4 | 1,500 | Steam [2] | 1 | 88 |

[1] Composition of tail gas was 90% methane, 10% ethylene.
[2] Charge to operation #3 and #4 was the product charcoal from operation #2.

Having described the invention it is claimed:

1. In an adsorption process which comprises contacting feed gases with an active carbon in an adsorption zone, removing tail gases overhead from said adsorption zone, removing carbon containing adsorbed constituents thereon from said adsorption zone and separating said adsorbed constituents from said carbon in a desorption zone, the improvement which comprises thereafter contacting said desorbed carbon in an initial reactivation zone with at least a portion of said tail gases at a temperature of 900° F. to 1100° F. and thereafter further treating said carbon in a secondary reactivation zone with steam at a temperature in the range of 1200° F. to 1800° F.

2. Process as defined by claim 1 wherein said feed gases comprise hydrocarbon constituents containing less than about 5 carbon atoms in the molecule.

3. In an adsorption process which comprises contacting feed gases with active carbon in an adsorption zone, removing tail gases overhead from said adsorption zone and removing active carbon containing adsorbed constituents thereon from the bottom of said adsorption zone, treating the active carbon containing the adsorbed constituents in a desorption zone under conditions to remove adsorbed constituents therefrom, and thereafter recycling a portion of the active carbon to said adsorption zone, the improvement which comprises contacting the remainder in an initial reactivation zone with at least a portion of said tail gases at a temperature of 900° F. to 1100° F., thereafter recycling a portion of the carbon from said initial reactivation zone to said adsorption zone and contacting the remainder with steam in a secondary reactivation zone at a temperature in the range of 1200° F. to 1800° F., removing the carbon from said secondary reactivation zone and recycling at least a portion thereof to said adsorption zone.

4. Process as defined by claim 3 wherein from about 25% to 75% of the carbon fed to said desorption zone and fed to said initial reactivation zone is withdrawn from said zones and recycled directly to said adsorption zone.

5. In an adsorption process comprising contacting hydrocarbon gases with activated carbon in an adsorption zone, removing unadsorbed hydrocarbon gases as tail gases overhead from said adsorption zone, removing rich carbon containing hydrocarbon gases adsorbed thereon from the adsorption zone to a desorption zone, and removing the adsorbed constituents from the carbon in said desorption zone, the improvement which comprises contacting said desorbed carbon in a reactivation zone with at least a portion of the tail gases at a temperature of 900° F. to 1100° F.

6. A process according to claim 5 wherein the hydrocarbon gases contain hydrocarbons of 1 to 5 carbon atoms per molecule.

References Cited in the file of this patent

UNITED STATES PATENTS

| Number | Name | Date |
|---|---|---|
| 586,278 | Weinrich | July 13, 1897 |
| 1,945,479 | Davis | Jan. 30, 1934 |
| 2,428,715 | Marisic | Oct. 7, 1947 |
| 2,443,714 | Arveson | June 22, 1948 |
| 2,523,149 | Scheeline | Sept. 19, 1950 |

OTHER REFERENCES

"Hypersorption Process," Clyde Berg; A. I. Ch. E. Transactions, August 25, 1946, pages 665 to 680.